(12) United States Patent
Katsuda et al.

(10) Patent No.: US 11,729,322 B2
(45) Date of Patent: Aug. 15, 2023

(54) VOICE OPERATION SYSTEM, VOICE OPERATION METHOD, AND PROGRAM

(71) Applicant: KONICA MINOLTA, INC., Tokyo (JP)

(72) Inventors: Takeo Katsuda, Tokyo (JP); Yusuke Mikoshiba, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 17/671,741

(22) Filed: Feb. 15, 2022

(65) Prior Publication Data

US 2022/0174162 A1 Jun. 2, 2022

Related U.S. Application Data

(63) Continuation of application No. 17/010,298, filed on Sep. 2, 2020, now Pat. No. 11,283,944.

(30) Foreign Application Priority Data

Sep. 24, 2019 (JP) .................................. 2019-172514

(51) Int. Cl.
*H04N 1/08* (2006.01)
*H04N 1/00* (2006.01)
(Continued)

(52) U.S. Cl.
CPC ......... *H04N 1/00403* (2013.01); *G10L 15/26* (2013.01); *H04N 1/0048* (2013.01); *H04N 1/00474* (2013.01); *G10L 2015/228* (2013.01)

(58) Field of Classification Search
CPC ............................ H04N 1/00403; G10L 15/26
See application file for complete search history.

(56) References Cited

U.S. PATENT DOCUMENTS

2005/0099644 A1* 5/2005 Nomoto ................ G06F 3/1255
358/1.12
2009/0059273 A1* 3/2009 Tomita ................ H04N 1/00413
358/1.15
(Continued)

FOREIGN PATENT DOCUMENTS

JP 2019095520 A 6/2019

*Primary Examiner* — Ibrahim Siddo
(74) *Attorney, Agent, or Firm* — Buchanan Ingersoll & Rooney PC

(57) ABSTRACT

A voice operation system includes: an image forming apparatus that forms an image on a recording material; a server that accepts voice information related to an operation on the image forming apparatus, and gives an operation instruction to the image forming apparatus; and a voice input/output device that converts an input voice into voice information, sends the voice information to the server, receives voice information as a response to the voice information related to the operation on the image forming apparatus, and emits a sound of the voice information, wherein the server has a hardware processor that stores information on a part of a function or configuration of the image forming apparatus, and the server determines executability of an operation associated with voice information transmitted from the voice input/output device, and causes the image forming apparatus to execute determination of executability of an operation that is not determinable.

12 Claims, 13 Drawing Sheets

(51) Int. Cl.
*G10L 15/26* (2006.01)
*G10L 15/22* (2006.01)

(56) References Cited

U.S. PATENT DOCUMENTS

2018/0288248 A1* 10/2018 Shen .................. H04N 1/00403
2021/0092243 A1 3/2021 Katsuda et al.

* cited by examiner

EXAMPLE OF PROHIBITION RESPONSE
BASED ON APPARATUS CONFIGURATION

EXAMPLE OF PROHIBITION RESPONSE
BASED ON ADDITIONAL INFORMATION

VOICE OPERATION SYSTEM, VOICE OPERATION METHOD, AND PROGRAM

The present application is a continuation of U.S. Ser. No. 17/010,298, filed on Sep. 2, 2020, and which claims the priority of Japanese patent Application No. 2019-172514, filed on Sep. 24, 2019. The entire disclosures of U.S. Ser. No. 17/010,298 and Japanese patent Application No. 2019-172514 are incorporated herein by reference in their entirety.

BACKGROUND

Technological Field

The present invention relates to a voice operation system, a voice operation method, and a program.

Description of the Related Art

A conventional image forming apparatus that forms an image on a sheet is configured to notify the user, through display on an operation screen or output of a warning sound, of functions that are unavailable due to the configuration and state of the apparatus or functions that are determined to be unavailable depending on combinations of multiple functions.

For example, an image forming apparatus that does not support color printing shows unavailable functions such as color copying by making color printing unselectable on the operation screen. In addition, sheets of a specific size are unavailable unless they are contained in a tray. For functions that cannot be implemented due to such a situation, operation buttons are displayed on the operation screen in a display form called grayout, which is different from the normal display form, to indicate the unavailability of the functions.

If an operation is performed for setting a prohibited combination item such as a combination of monochrome and compact PDF, which is one of the standards for converting images into data, a warning text message indicating the prohibition of the combination is presented on the operation screen after the operation.

At the same time as warnings on these operation screens, the apparatus can also output a simple warning sound such as "beep".

Aside from operations on the operation panel of the image forming apparatus, image processing systems have been proposed in recent years in which voice-input operations (hereinafter also referred to as "voice operations") can be performed on the image forming apparatus. In such an image forming system, a voice uttered by the user is input to a voice input/output device including a smart speaker or the like having a voice recognition function. In the voice input/output device, the input voice is converted into voice data, and the voice data are sent to a voice processing server provided in a cloud or the like. Then, the voice processing server sends, to the image forming apparatus, an instruction (command) corresponding to the voice input to the voice input/output device. Upon receiving the instruction from the voice processing server, the image forming apparatus executes the process specified by the instruction, such as printing.

JP 2019-95520 A describes a technique of operating a printing apparatus using a voice control device such as a smart speaker.

Considering a case in which a voice input for any of the above-described unavailable functions is given through the smart speaker to operate the image forming apparatus, it is necessary to inform the user that the operation specified by the voice input is invalid using a response by voice (voice response).

In such a case, the voice-input instruction accepted by the smart speaker is transmitted to the image forming apparatus through the voice processing server. Then, the image forming apparatus receives the instruction and determines that the operation corresponding to the voice-input instruction is unperformable. After the image forming apparatus determines that the operation is unperformable, a response indicating that the operation is unperformable is returned from the image forming apparatus to the smart speaker through the voice processing server. Thus, the smart speaker outputs a voice such as "this operation cannot be executed" to inform the user that the operation is unperformable.

In this way, a series of processes starting with accepting a voice input and finishing with providing a voice response indicating that the corresponding operation is unperformable is performed by reciprocal transmission between the smart speaker and the image forming apparatus through the voice processing server. Therefore, it takes time until the image forming apparatus outputs a message that the operation is unperformable. Thus, after giving an operation instruction, the user has to wait until the user receives a response to the instruction, which causes the user to feel stress.

A possible way to solve this problem is that the voice processing server constantly monitors the state of the image forming apparatus so that the voice processing server can always grasp situations such as paper exhaustion or toner exhaustion. This enables the voice processing server to immediately determine the performability of printing in the image forming apparatus at the time that the voice processing server receives an instruction from the smart speaker. Therefore, the voice processing server can immediately instruct the smart speaker to output a message that printing is unperformable, and thus can reduce the time to response output.

However, in order for the voice processing server to constantly monitor the state of the image forming apparatus, the voice processing server needs to regularly monitor the state of the image forming apparatus, which imposes a high load on the voice processing server and thus is problematic.

SUMMARY

The present invention has been made in view of these situations, and an object thereof is to provide a voice operation system, a voice operation method, and a program that can promptly and accurately respond to a voice input for an unperformable operation and convey that the operation is unperformable, without increasing the load on the server.

To achieve the abovementioned object, according to an aspect of the present invention, a voice operation system reflecting one aspect of the present invention comprises: an image forming apparatus that forms an image on a recording material; a server that accepts voice information related to an operation on the image forming apparatus, and gives an operation instruction to the image forming apparatus; and a voice input/output device that converts an input voice related to an operation into voice information, sends the voice information to the server, receives, from the server, voice information as a response to the voice information related to the operation on the image forming apparatus, and emits a sound of the voice information, wherein the server has a hardware processor that stores information on a part of a function or configuration of the image forming apparatus, and the server determines executability of an operation associated with voice information transmitted from the voice input/output device based on the function or configuration stored in the hardware processor, and causes the image forming apparatus to execute determination of executability of an operation that is not determinable from the function or configuration stored in the hardware processor.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments. In the present specification and drawings, components having substantially the same function or configuration are denoted by the same reference sign, and duplicate descriptions of components in a plurality of exemplary embodiments are omitted.

First Embodiment

[Configuration of Image Processing System]

Figure 1:
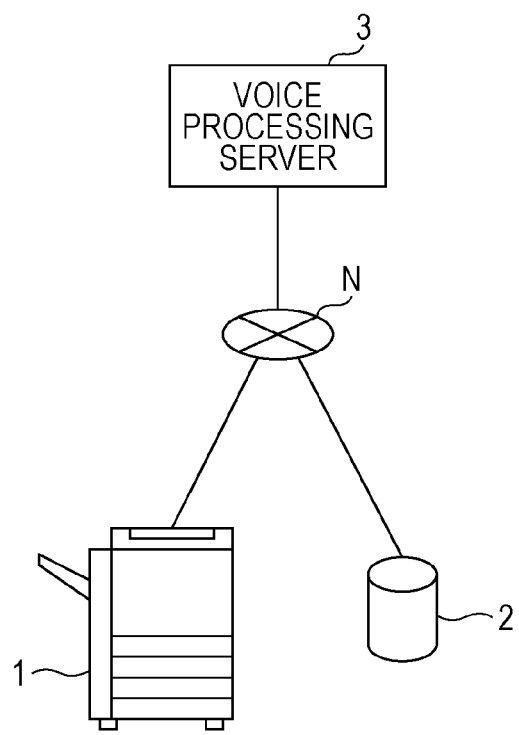
FIG. 1 is a schematic configuration diagram of an image processing system according to a first embodiment of the present invention.

First, the configuration of the image processing system according to the first embodiment of the present invention will be described with reference to FIG. 1. FIG. 1 is a schematic configuration diagram of the image processing system 100 according to the first embodiment of the present invention.

The image processing system 100 illustrated in FIG. 1 includes an image forming apparatus 1, a voice input/output device 2, and a voice processing server 3. The voice input/output device 2 and the voice processing server 3, and the voice processing server 3 and the image forming apparatus 1 are connected via a network N such as a public switched telephone network or an Internet Protocol (IP) network.

The image forming apparatus 1 is, for example, multi-functional peripherals (M P) having a copy function, a printer function, a scanner function, and the like. The image forming apparatus 1 forms an image on a sheet (an example of a recording material) based on image data sent from a printer controller (not illustrated) or the like, and outputs the sheet with the image formed as a printed matter.

The voice input/output device 2 is, for example, a smart speaker, and includes a microphone and a speaker (not illustrated). The voice input/output device 2 converts a voice collected by the microphone, e.g. an operation instruction by a voice uttered by the user, into voice data (hereinafter also referred to as "voice information"), and sends the voice information to the voice processing server 3. The voice input/output device 2 also receives voice information sent from the voice processing server 3 and outputs a voice from the speaker.

The voice processing server 3 is provided, for example, on a cloud (not illustrated), and its function is offered as a cloud application service. The voice processing server 3 performs voice analysis processing on the voice information sent (input) from the voice input/output device 2. Then, the voice processing server 3 sends, to the voice input/output device 2 or the image forming apparatus 1, a command (instruction) for the image forming apparatus 1, response voice information, notification voice information, or the like corresponding to the result of voice analysis processing. Note that commands (instructions), response voice information, notification voice information, etc., are information extracted from a storage 313 described later with reference to FIG. 2.

Here, response voice information is a voice that conveys response information for an operation instruction (voice operation) uttered by the user to the voice input/output device 2, and notification voice information is a voice that conveys notification information from the image forming apparatus 1, such as error occurrence and job termination Commands for the image forming apparatus 1 include, for example, job setting instructions such as printing, copying, and scanning, job start instructions, and the like.

The present embodiment describes an example in which the voice processing server 3 is provided on a cloud, but the present invention is not limited to this. The voice processing server 3 may be provided in the image forming apparatus 1. Further, another server may be provided between the voice processing server 3 and the image forming apparatus 1 to relay information regarding jobs.

[Configurations of Control Systems of Image Forming Apparatus and Voice Input/Output Device]

Next, with reference to FIG. 2, exemplary configurations of the control systems of the image forming apparatus 1 and the voice input/output device 2 included in the image processing system 100 will be described.

[Configuration of Control System of Image Forming Apparatus]

First, the configuration of the control system of the image forming apparatus 1 will be described. As illustrated in FIG. 2, the image forming apparatus 1 includes a communicator 11, a controller 12, an image former 13, a voice response processor 14, a voice outputter 15, and an operation display 16.

The communicator 11 controls various data transmission/reception operations performed with the voice processing server 3 connected via the network N.

The controller 12 includes a central processing unit (CPU) 120, a random access memory (RAM) 121, a read only memory (ROM) 122, and a storage 123.

The CPU 120 reads various processing programs stored in the ROM 122, such as a system program for controlling the entire system and an image forming processing program, expands the read programs in the RAM 121, and controls the operation of each component of the image forming apparatus 1 in accordance with the expanded programs.

For example, the CPU 120 performs control to cause the image former 13 to execute the image forming process associated with a command input from the voice processing server 3. In addition, in the event that a setting that is based on a voice operation instruction by the user fails due to prohibition or the like, an error occurs during the execution of a job in the image forming apparatus 1, or the like, the CPU 120 instructs the voice response processor 14 to notify the user that the operation is unperformable using a voice response or a sound.

The RAM 121 forms a work area for temporarily storing various programs that are executed by the CPU 120 and data related to these programs. The work area of the RAM 121 stores job queues, various operation settings, and the like.

The ROM 122 includes a non-volatile memory or the like such as a semiconductor memory. The ROM 122 stores a system program corresponding to the image forming apparatus 1 and an image forming processing program, a voice response processing program, and the like executable on the system program. These programs are stored in the form of a computer readable program code, and the CPU 120 sequentially executes operations conforming to the program code.

The storage 123 includes a hard disk drive (HDD), a solid state drive (SSD), and the like. The storage 123 stores various setting data related to the image forming apparatus 1, voice data (voice response information, voice notification information, etc.) corresponding to various instructions sent from the CPU 120 to the voice response processor 14, and the like.

The image former 13 forms an image on a sheet based on image data sent from the printer controller (not illustrated) or the like, and outputs the sheet with the image formed as a printed matter. The image former 13 includes a charging device, a photoconductor drum, an exposure device, a transfer belt, and a fixing device, which are not illustrated.

The image former 13 first forms an electrostatic latent image on the circumference of the photoconductor drum by irradiating the photoconductor drum charged by the charging device with light corresponding to the image using the exposure device. Next, the image former 13 supplies toner from a developing device to the photoconductor drum to attach the toner to the charged electrostatic latent image and develop the toner image. Next, the image former 13 primarily transfers the toner image to the transfer belt, secondarily transfers the toner image transferred to the transfer belt to a sheet, and further fixes the transferred toner image on the sheet using the fixing device.

The present embodiment describes an example in which the image former 13 forms an image using electrophotography, but the present invention is not limited to this. An image processing system and an image forming apparatus of the present invention may use an image former that forms an image with another technique such as inkjet printing.

The voice response processor 14 extracts and generates, from the storage 123 or the like, voice information corresponding to an instruction input from the CPU 120, and outputs the voice information to the voice outputter 15. As described above, an instruction from the CPU 120 is given when a setting that is based on a voice operation instruction fails due to prohibition or the like, when an error occurs during operation, or the like.

The voice outputter 15 is, for example, a speaker, and reproduces and outputs the voice information input from the voice response processor 14 as a voice.

The operation display 16 is configured as, for example, a touch panel in which an operation screen display including a liquid crystal display (LCD), organic electroluminescence (EL), or the like and an operation inputter including a touch sensor or the like are integrally formed.

The present embodiment describes an example in which the display and the operation inputter are integrally formed as the operation display 16, but the present invention is not limited to this. The display and the operation inputter including a keyboard, a mouse, and the like may be separately configured. Alternatively, in addition to the operation display 16 configured as a touch panel, an operation inputter including a keyboard, a mouse, and the like may be provided.

[Configuration of Control System of Voice Processing Server]

Referring again to FIG. 2, the configuration of the control system of the voice processing server 3 will be described. As illustrated in FIG. 2, the voice processing server 3 includes a controller 31, a communicator 32, and a voice analyzer 33.

The controller 31 includes a CPU 310, a RAM 311, a ROM 312, and the storage 313.

The CPU 310 reads various processing programs stored in the ROM 312, such as a system program and a voice processing program, expands the read programs in the RAM 311, and controls the operation of each component of the voice processing server 3 in accordance with the expanded programs.

For example, when voice information is sent from the voice input/output device 2, the CPU 310 performs control to send various instructions regarding the image processing job corresponding to the voice information to the image forming apparatus 1 via the communicator 32. In addition, for example, when response information is sent from the image forming apparatus 1, the CPU 310 performs control to send the voice information corresponding to the response information to the voice input/output device 2 via the communicator 32.

In the RAM 311, a work area is formed to temporarily store various programs that are executed by the CPU 310 and data related to these programs.

The ROM 312 includes a non-volatile memory or the like such as a semiconductor memory. The ROM 312 stores a system program corresponding to the voice processing server 3 and a voice processing program and the like executable on the system program. These programs are stored in the form of a computer readable program code, and the CPU 310 sequentially executes operations conforming to the program code.

The storage 313 includes an HDD, an SSD, and the like. The storage 313 stores various setting data related to the voice processing server 3, instructions regarding image processing jobs associated with voice analysis results by the voice analyzer 33, and the like.

The storage 313 also stores information indicating executability in the image forming apparatus 1 connected via the network N (hereinafter, this information is referred to as "prohibition determination information"). The prohibition determination information of the image forming apparatus 1 stored in the storage 313, which will be described in detail later, includes basic information that is based on the configuration or function of the image forming apparatus 1 and additional information that is generated due to settings of the image forming apparatus 1 or the like.

The communicator 32 controls various data transmission/reception operations performed with the voice input/output device 2 and the image forming apparatus 1 via the network N.

The voice analyzer 33 analyzes the voice information sent from the voice input/output device 2, reads an instruction corresponding to the voice analysis result, e.g. setting information, a job start instruction, or the like, from the storage 313, and outputs the read instruction to the controller 31. The voice analyzer 33 also analyzes the voice information sent from the voice input/output device 2, reads response voice information, notification voice information, or the like corresponding to the voice analysis result from the storage 313, and outputs the read information to the controller 31.

[Voice Response Processing by Image Processing System]

Next, with reference to FIGS. 3A, 3B, and 4, an outline of voice response processing by the image processing system 100 according to the first embodiment of the present invention will be described.

Here, we consider an example of a response (prohibition response) for the case that the user gives a voice operation instruction to the voice input/output device 2 but this operation cannot be executed in the image forming apparatus 1.

Figure 3A:
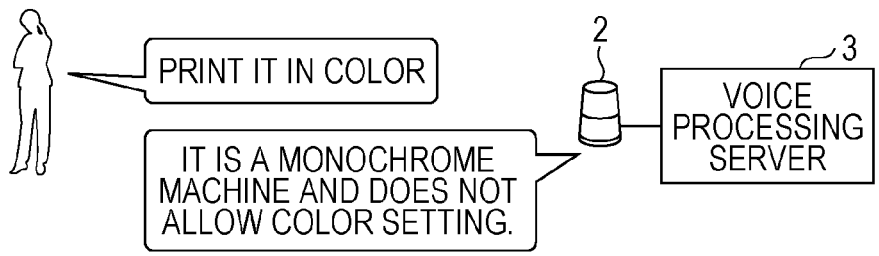
FIGS. 3A and 3B are diagrams illustrating outlines of two examples of prohibition responses according to the first embodiment of the present invention.

The example illustrated in FIG. 3A indicates that the operation specified by the user through voice results in a prohibition response due to the configuration of the image forming apparatus 1. Specifically, in this example, the user gives the voice instruction "print it in color" to the voice input/output device 2 as a print setting.

Here, the image forming apparatus 1 is configured to be capable of monochrome printing but incapable of color printing. The prohibition determination information regarding the configuration of the image forming apparatus 1 is information stored as basic information in the storage 313 of the voice processing server 3.

Therefore, when the voice information "print it in color" is transmitted from the voice input/output device 2 to the voice processing server 3, the voice processing server 3 determines that the specified operation is inexecutable based on the basic information of the image forming apparatus 1 stored in the storage 313.

After determining that the specified operation is inexecutable, the voice processing server 3 transmits voice information indicating that the operation is inexecutable to the voice input/output device 2. The voice input/output device 2 outputs (emits) the transmitted voice through the speaker.

For example, as illustrated in FIG. 3A, the voice input/output device 2 outputs the response voice "it is a monochrome machine and does not allow color setting" and notifies the user that the specified operation is inexecutable.

Figure 3B:
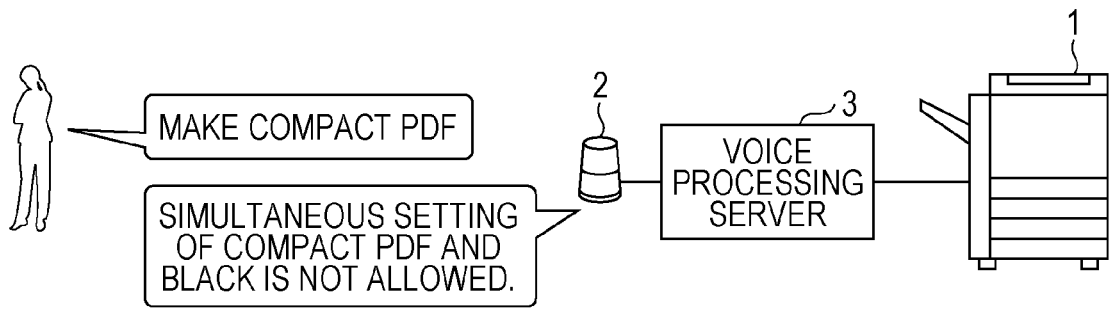

The example illustrated in FIG. 3B indicates that the operation specified by the user through voice results in a prohibition response due to a combination of multiple functions. Specifically, in this example, the user first sets black (monochrome) as a document data conversion setting and then gives the voice instruction "make compact PDF" to the voice input/output device 2.

Here, the combination of monochrome and compact PDF cannot be executed according to the PDF standard Because the prohibition determination information indicating the executability of the combination of monochrome and compact PDF is not stored in the storage 313 of the voice processing server 3, the voice processing server 3 gives an instruction for the combination of monochrome and compact PDF to the image forming apparatus 1.

Upon receiving the instruction for the combination of monochrome and compact PDF, the image forming apparatus 1 determines that the combination cannot be executed and transmits an instruction indicating that the combination is inexecutable to the voice processing server 3. After receiving the instruction indicating that the combination is inexecutable, the voice processing server 3 transmits voice information indicating that the combination is inexecutable to the voice input/output device 2. The voice input/output device 2 outputs (emits) the transmitted voice through the speaker.

For example, as illustrated in FIG. 3B, the voice input/output device 2 outputs the response voice "simultaneous setting of compact PDF and black is not allowed" and notifies the user that the specified operation is inexecutable.

As described above, in the first embodiment of the present invention, depending on the type of operation specified by the user through voice to the voice input/output device 2, the voice processing server 3 directly returns to the voice input/output device 2 that the operation is inexecutable, or returns to the voice input/output device 2 after the image forming apparatus 1 performs determination.

Figure 4:
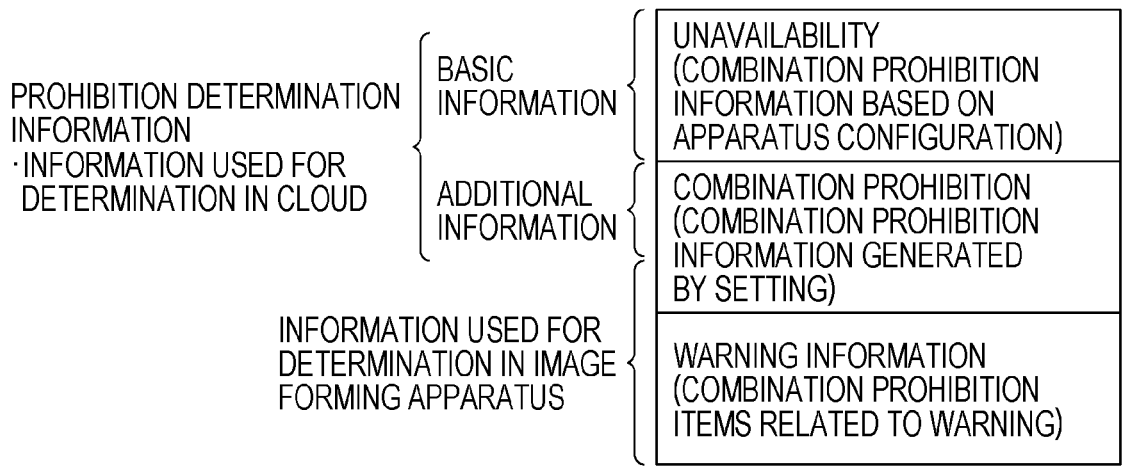
FIG. 4 is a diagram illustrating the classification of prohibition determination information according to the first embodiment of the present invention.

FIG. 4 is a diagram illustrating the classification of prohibition determination information in the first embodiment of the present invention.

In the present embodiment, as illustrated in FIG. 4, prohibition determination information for determining that specified operations cannot be executed in the image forming apparatus 1 is classified into three types: basic information, additional information, and other information.

Basic information is prohibition determination information that indicates prohibition and unavailability based on a combination of configurations of the image forming apparatus 1, and always prohibits operations concerned regardless of the state of the image forming apparatus 1.

This basic information is stored in the storage 313 of the voice processing server 3. For example, prohibition determination information that is based on the configuration of the apparatus, such as whether the apparatus is configured to be capable of color printing, whether the apparatus is configured to be capable of double-sided printing, and whether the apparatus is configured to be capable of A3 paper printing, is stored as basic information in the storage 313. For storing these items of basic information in the storage 313, for example, the voice processing server 3 acquires information on the configuration of the image forming apparatus 1 during the registration of the image forming apparatus 1 as a machine operable by the voice processing server 3.

Additional information is prohibition determination information that indicates unavailability based on conditions such as combinations of settings and functions, and does not depend on the configuration of the image forming apparatus 1. This additional information is stored in the storage 313 of the voice processing server 3 similarly to the basic information. However, unlike the basic information, the additional information is not stored at the time of machine registration. Instead, the voice processing server 3 acquires the additional information sent from the image forming apparatus 1 and stores the additional information in the storage 313.

Other information is information that indicates prohibition and unavailability in accordance with the state or situation of the image forming apparatus 1.

This type of information that indicates unavailability includes, for example, combination prohibition information generated by setting and combination prohibition items related to warning. This type of information that indicates unavailability is used for determination in the image forming apparatus 1 and cannot be used for determination in the voice processing server 3.

[Processing for Acquiring Prohibition Determination Information by Voice Processing Server]

Figure 5:
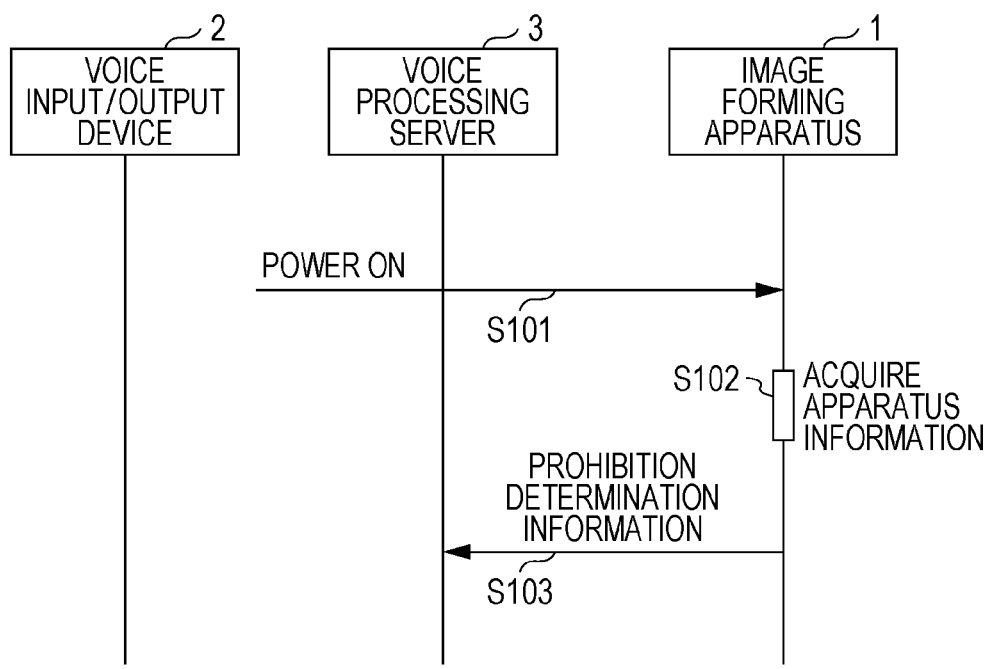
FIG. 5 is a sequence diagram illustrating an exemplary procedure according to the first embodiment of the present invention.

FIG. 5 is a sequence diagram illustrating the procedure for acquiring prohibition determination information as additional information from the image forming apparatus 1 by the voice processing server 3.

As illustrated in FIG. 5, the image forming apparatus 1 is powered on (step S101), and the controller 12 in the image forming apparatus 1 reads setting information in the apparatus and acquires prohibition determination information corresponding to additional information (step S102).

The acquired prohibition determination information is transmitted from the image forming apparatus 1 to the voice processing server 3 (step S103). The prohibition determination information received by the voice processing server 3 is stored in the storage 313 under the control of the controller 31.

[Processing in Image Forming Apparatus]

Figure 6:
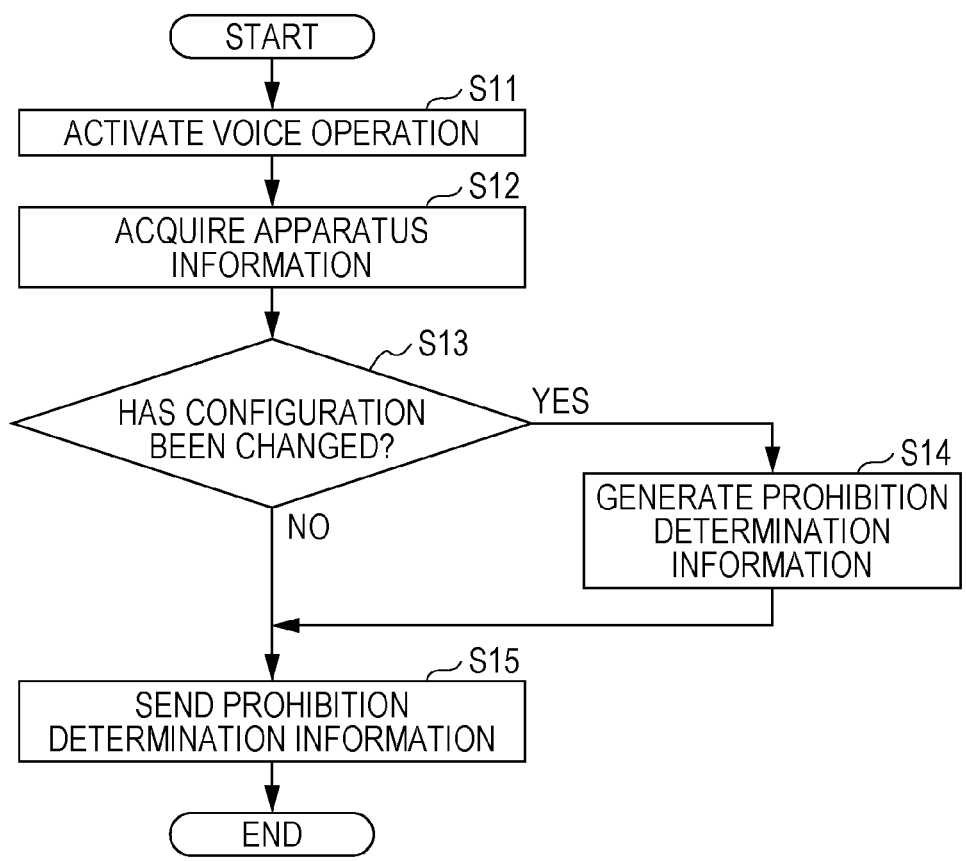
FIG. 6 is a flowchart illustrating an exemplary process according to the first embodiment of the present invention.

FIG. 6 is a flowchart illustrating the procedure for sending prohibition determination information by the image forming apparatus 1.

First, the controller 12 of the image forming apparatus 1 activates the voice operation function (step S11). Once the voice operation function is activated, the controller 12 confirms the current state of each component of the image forming apparatus 1 and acquires apparatus information (step S12).

After acquiring apparatus information, the controller 12 of the image forming apparatus 1 determines from the acquired apparatus information whether the apparatus configuration has been changed (step S13).

If it is determined in step S13 that the apparatus configuration has been changed (YES in step S13), the controller 12 generates prohibition determination information that is based on the new apparatus configuration (step S14).

If it is determined in step S13 that the apparatus configuration has not been changed (NO in step S13), or after generating new prohibition determination information in step S14, the controller 12 transmits the obtained prohibition determination information to the voice processing server 3 (step S15).

The prohibition determination information transmitted to the voice processing server 3 in this manner is stored in the storage 313 of the voice processing server 3 as additional information.

As described above, according to the present exemplary embodiment, voice operations may be determined to be unperformable by the voice processing server 3 or by the image forming apparatus 1, depending on the type of operation. Therefore, prohibition determination is shared by the voice processing server 3 and the image forming apparatus 1. Thus, the voice processing server 3 does not need to store all prohibition determination information about the image forming apparatus 1. Accordingly, the amount of information that is stored in the storage 313 of the voice processing server 3 can be reduced, and the load for determination processing on the voice processing server 3 can also be reduced.

When the voice processing server 3 determines that an operation is unperformable, the voice processing server 3 directly transmits the operation command to the voice input/output device 2 without transmitting the operation command to the image forming apparatus 1. Accordingly, the response indicating that the operation is unperformable can be promptly output from the speaker of the voice input/output device 2.

In contrast, when the image forming apparatus 1 performs prohibition determination, it takes a slightly longer time to respond than when the voice processing server 3 directly performs determination, because of the communication to the image forming apparatus 1. However, such a case only applies to some operation instructions that the voice processing server 3 could not determine as unperformable, and thus it is possible to speed up the response time for unperformable operations as a whole.

Second Embodiment

Next, an image processing system according to the second embodiment of the present invention will be described with reference to FIGS. 7 to 9.

Figure 2:
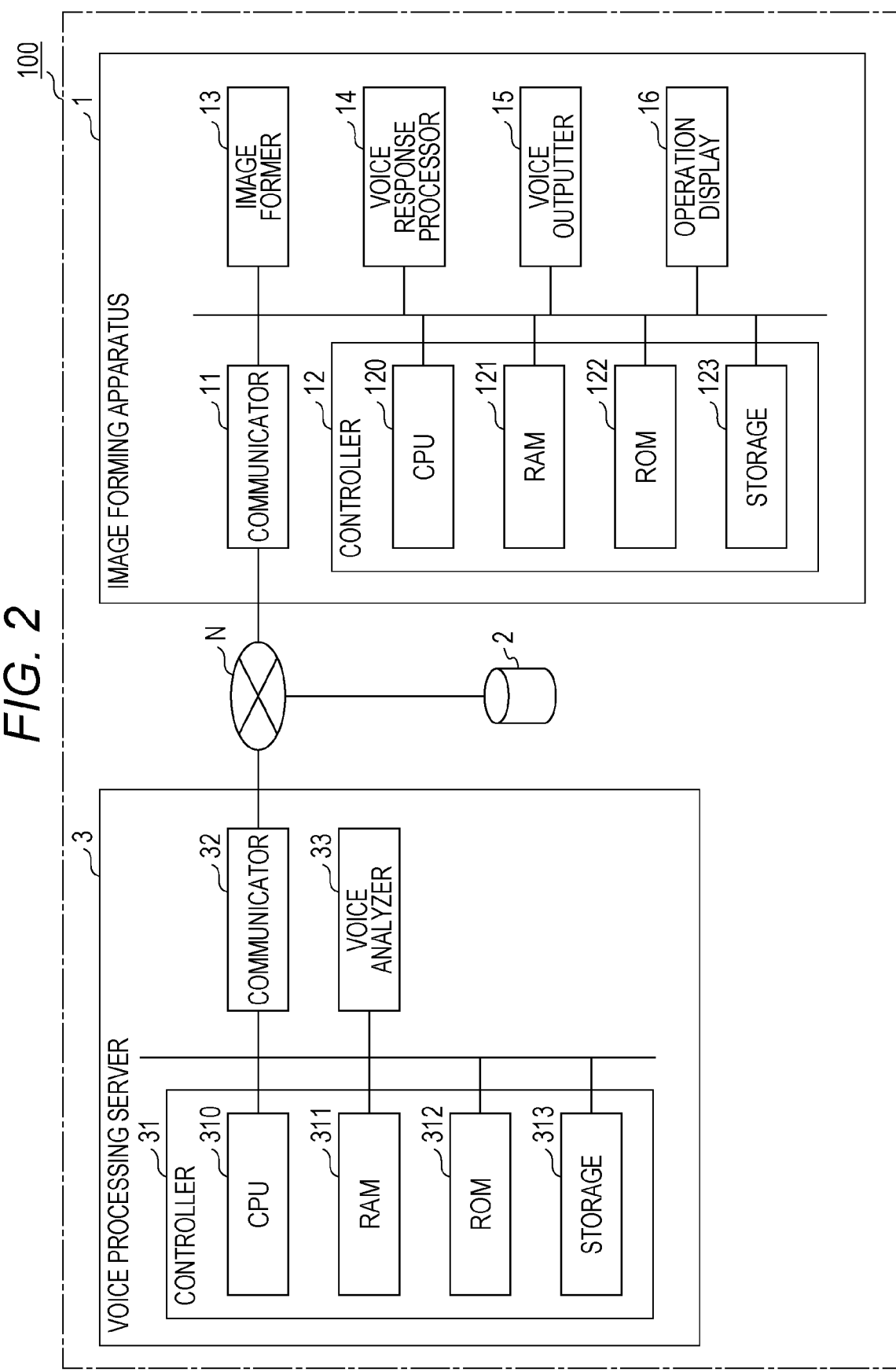
FIG. 2 is a block diagram illustrating exemplary configurations of control systems of an image forming apparatus and a voice input/output device included in the image processing system according to the first embodiment of the present invention.

The overall configuration of the image processing system 100 according to the second embodiment of the present invention and the configurations of the image forming apparatus 1 and the voice processing server 3 in the image processing system 100 are the same as those described in the first embodiment with reference to FIGS. 1 and 2, and duplicate descriptions are omitted.

Figure 7:
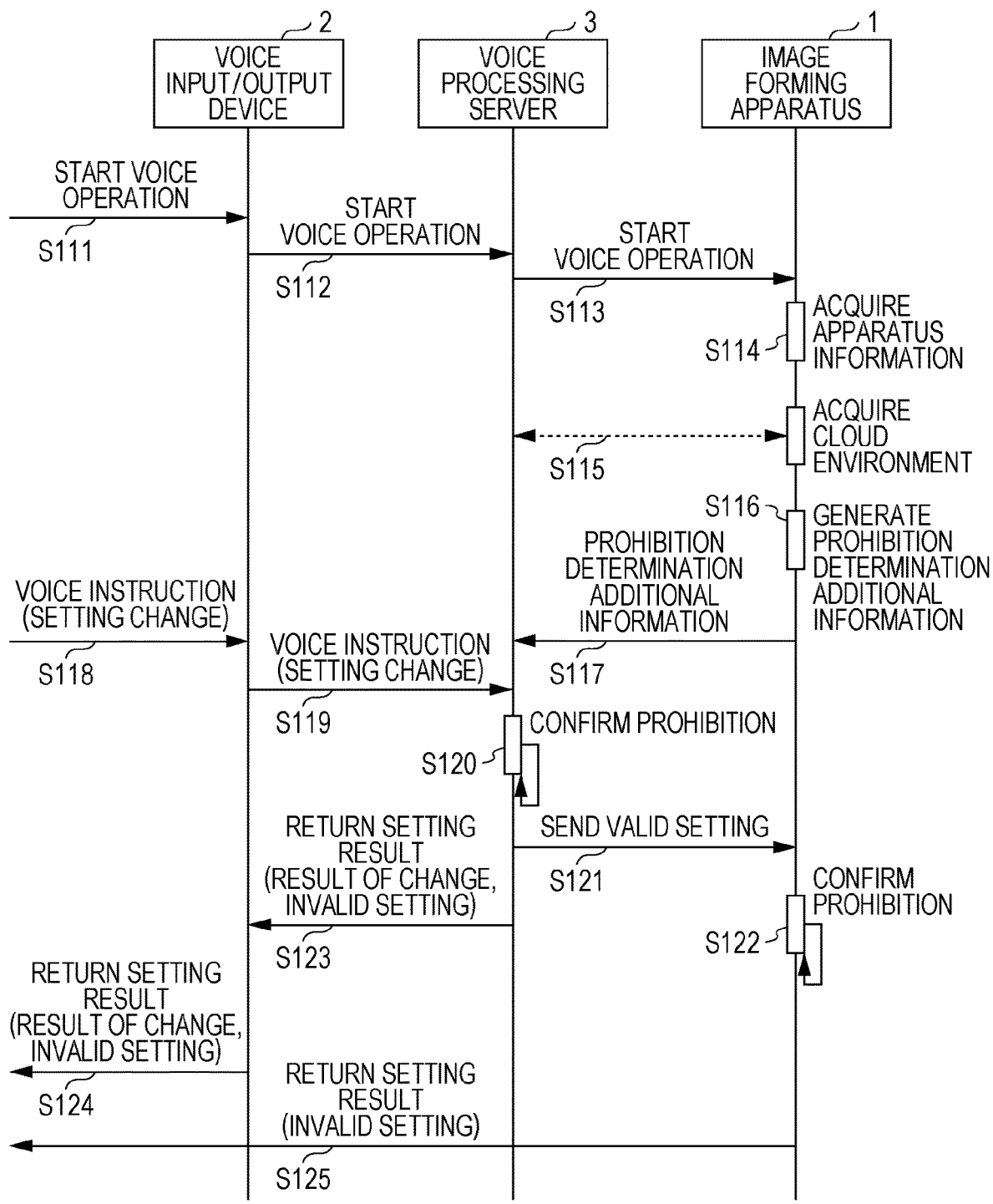
FIG. 7 is a sequence diagram illustrating an exemplary procedure according to a second embodiment of the present invention.

FIG. 7 is a sequence diagram illustrating an exemplary process for a voice operation on the image forming apparatus 1 performed in the image processing system 100 according to the present embodiment.

First, the voice input/output device 2 is subjected to a voice operation start process, for example, by being powered on (step S111), and the voice input/output device 2 transmits a voice operation start instruction to the voice processing server 3 (step S112). In response to receiving the voice operation start instruction, the voice processing server 3 sends a voice operation start instruction to the image forming apparatus 1 (step S113).

Upon receiving the voice operation start instruction, the image forming apparatus 1 acquires its apparatus information (step S114). The apparatus information here includes not only basic conditions such as whether the apparatus itself can print, but also various situations such as the size of paper in each paper tray, the presence/absence of paper, the state of optional equipment for paper binding or the like, and paper jams.

The image forming apparatus 1 also acquires a cloud environment such as the state of communication with the voice processing server 3 and the processing speed of the voice processing server 3 (step S115). The cloud environment may be acquired by the image forming apparatus 1 communicating with the voice processing server 3, or may be determined by acquiring the response time or the like from the previous communication history.

Then, based on the acquired cloud environment, the image forming apparatus 1 generates additional information for prohibition determination to be registered in the voice processing server 3 (step S116), and sends the generated additional information for prohibition determination to the voice processing server 3 (step S117). The additional information for prohibition determination received by the voice processing server 3 is stored in the storage 313 (FIG. 2). The additional information sent to the voice processing server 3 reflects the apparatus information determined in step S114.

After such processing, the voice input/output device 2 can receive a voice input (step S118). In this case, the voice information is transmitted to the voice processing server 3 (step S119). The voice input here is a voice that gives an operation instruction for changing settings of printing or the like in the image forming apparatus 1.

In response to receiving the voice information, the voice processing server 3 confirms, based on information about the image forming apparatus 1 stored in the storage 313, whether the operation specified by the instruction corresponds to prohibition processing (step S120).

If it is determined in step S120 that the operation does not correspond to prohibition processing, the voice processing server 3 sends a command for the setting change by the voice operation as a valid setting to the image forming apparatus 1 (step S121). In response to receiving this setting change command, the image forming apparatus 1 confirms whether the setting change specified by the command corresponds to prohibition processing from the current state of the apparatus (step S122).

At the same time as sending the setting change command to the image forming apparatus 1 in step S121, the voice processing server 3 returns the setting result information to the voice input/output device 2 (step S123). Here, because the determination in step S120 is that the operation does not correspond to prohibition processing, the voice processing server 3 returns the result of the change. For example, the voice processing server 3 returns the voice information "the setting for XX has been accepted". If it is determined in step S120 that the operation corresponds to prohibition processing, the voice processing server 3 responds that the setting is invalid, and does not give a command to the image forming apparatus 1 in step S121. For example, the voice processing server 3 returns the voice information "the setting for XX is invalid".

Upon receiving the response in step S123, the voice input/output device 2 outputs the response message as a voice (step S124). That is, the voice input/output device 2 outputs a voice regarding the result of the change or a voice indicating that the setting is invalid.

In contrast, if it is confirmed in step S122 that the setting change specified by the command corresponds to prohibition processing from the current state of the apparatus, the image forming apparatus 1 returns the setting result indicating the invalid setting to the voice input/output device 2 through the voice processing server 3 (step S125). That is, the image forming apparatus 1 returns the voice information "the setting for XX is invalid". Upon receiving the setting result response, the voice input/output device 2 outputs a voice indicating that the received setting is invalid from the speaker.

Figure 8:
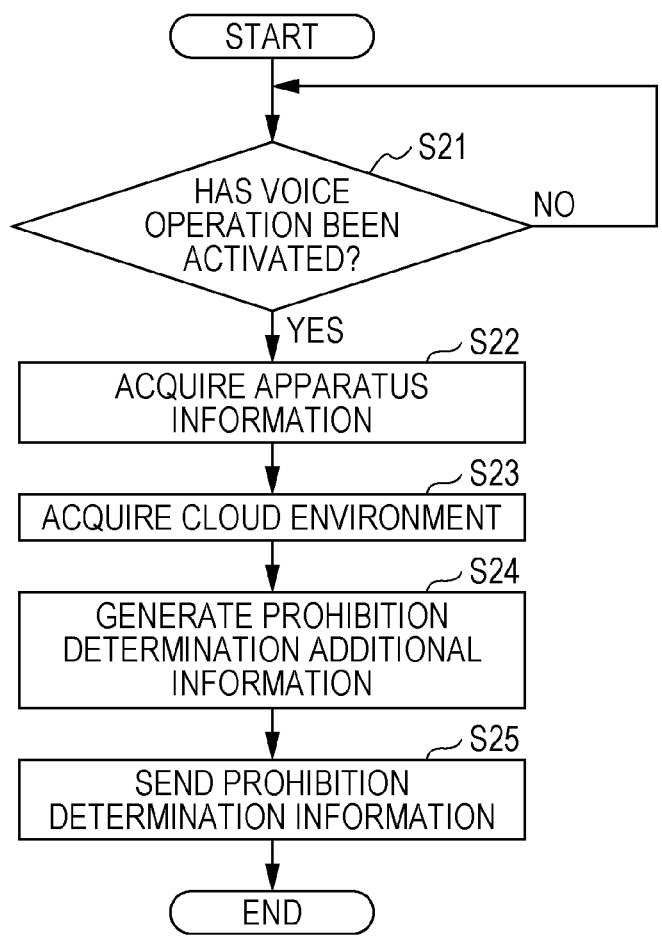
FIG. 8 is a flowchart illustrating an exemplary process in an image forming apparatus according to the second embodiment of the present invention.

FIG. 8 is a flowchart illustrating an exemplary process in the image forming apparatus 1 according to the present embodiment.

The controller 12 (FIG. 2) of the image forming apparatus 1 determines whether the voice operation has been activated by a command from the voice processing server 3 (step S21). If it is determined in step S21 that the voice operation has not been activated (NO in step S21), the determination in step S21 is repeated.

If it is determined in step S21 that the voice operation has been activated (YES in step S21), the controller 12 of the image forming apparatus 1 acquires apparatus information based on the current situation of the image forming apparatus 1 (step S22). Next, the controller 12 acquires the cloud environment of the voice processing server 3 (step S23).

Then, based on the cloud environment acquired in step S23, the controller 12 of the image forming apparatus 1 generates additional information for prohibition determination to be registered in the voice processing server 3 from the apparatus information acquired in step S22 (step S24). For example, suppose that the acquired cloud environment indicates that the speed of communication between the voice processing server 3 and the image forming apparatus 1 is slow. In this case, a relatively large amount of additional information for prohibition determination is to be registered.

The additional information for prohibition determination generated in step S24 is sent to the voice processing server 3 under the control of the controller 12 of the image forming apparatus 1 and stored in the voice processing server 3 (step S25).

Figure 9:
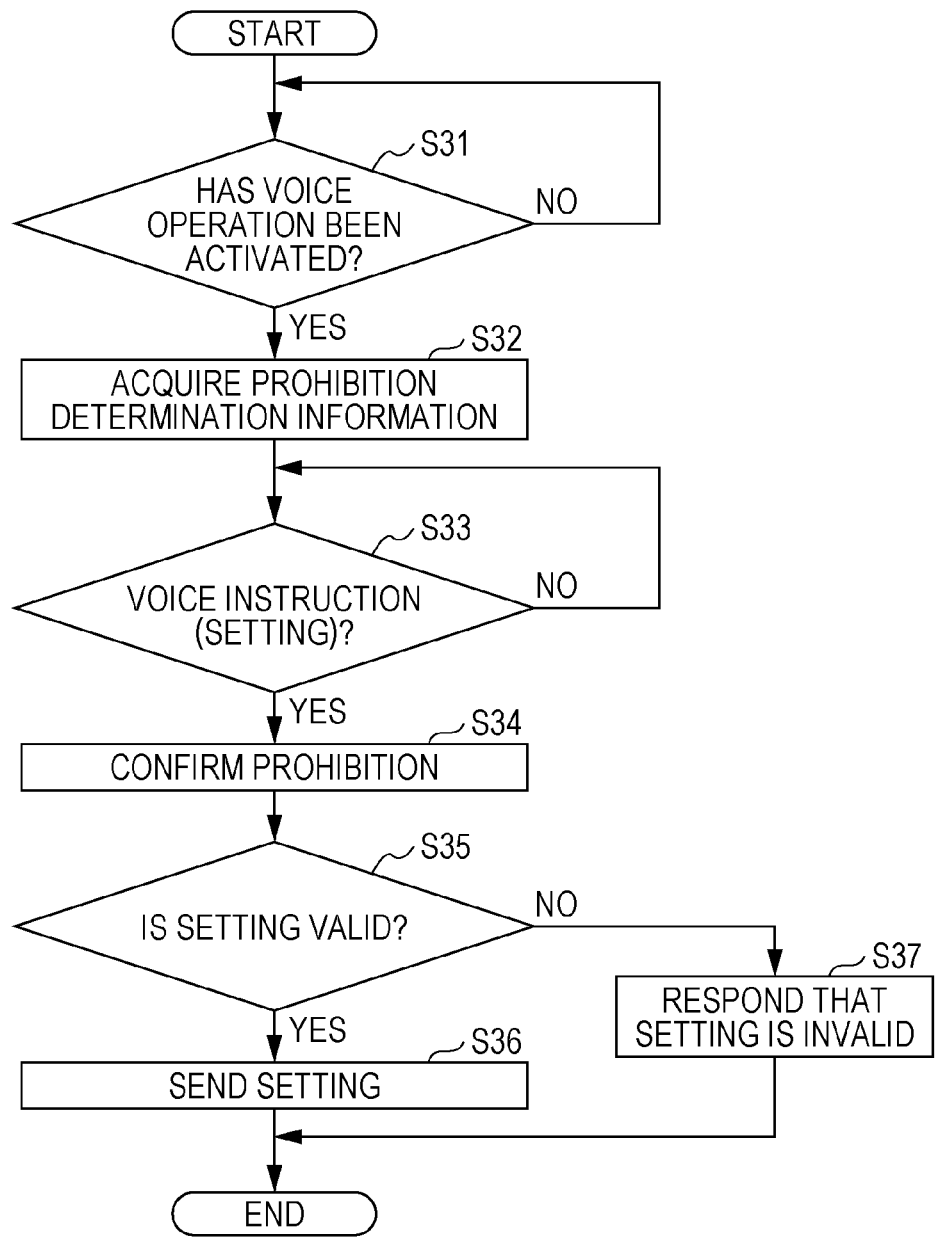
FIG. 9 is a flowchart illustrating an exemplary process in a voice processing server according to the second embodiment of the present invention.

FIG. 9 is a flowchart illustrating an exemplary process in the voice processing server 3 according to the present embodiment.

The controller 31 of the voice processing server 3 determines whether the voice operation has been activated by an instruction from the voice input/output device 2 (step S31). If it is determined in step S31 that the voice operation has not been activated (NO in step S31), the determination in step S31 is repeated.

If it is determined in step S31 that the voice operation has been activated (YES in step S31), the controller 31 of the voice processing server 3 acquires, from the storage 313, the prohibition determination information stored for the image forming apparatus 1 corresponding to the activated voice input/output device 2 (step S32). At this time, any prohibition determination information sent from the image forming apparatus 1 is stored in the storage 313.

After that, the controller 31 of the voice processing server 3 determines whether a voice instruction from the voice input/output device 2 has been received (step S33). If it is determined in step S33 that a voice instruction has not been received (NO in step S33), the determination in step S33 is repeated.

Then, if it is determined in step S33 that a voice instruction has been received (YES in step S33), the controller 31 of the voice processing server 3 confirms whether the received instruction, e.g. print setting instruction, corresponds to the prohibition determination information acquired in step S32 (step S34).

After the confirmation in step S34, the controller 31 of the voice processing server 3 determines whether the received instruction is valid or corresponds to the prohibition determination information (step S35). If it is determined in step S34 that the received instruction is valid (YES in step S35), the controller 31 of the voice processing server 3 sends the setting information specified by the voice instruction to the image forming apparatus 1 (step S36). At this time, the controller 31 of the voice processing server 3 may respond to the voice input/output device 2 that the setting has been accepted, if necessary.

If it is determined in step S34 that the received instruction corresponds to prohibition (NO in step S35), the controller 31 of the voice processing server 3 responds to the voice input/output device 2 that the setting is invalid (step S37).

As described above, in the present exemplary embodiment, instructions which the voice processing server 3 should process and respond to are dynamically set based on information from the image forming apparatus 1. Consequently, instructions which the voice processing server 3 can promptly process and respond to are appropriately set, and the voice processing server 3 and the image forming apparatus 1 can favorably perform the process of sharing operation prohibition notification processing during the voice operation service. In particular, by acquiring the cloud environment and adding prohibition determination information to be held by the voice processing server 3, response processing can be speeded up in situations where the speed of communication is slow due to network congestion or the like or situations where it takes time to reply over the network, which contributes to shortening the time from the user's voice instruction to the response.

Third Embodiment

Next, an image processing system according to the third embodiment of the present invention will be described with reference to FIGS. 10 to 11.

The overall configuration of the image processing system 100 according to the third embodiment of the present invention and the configurations of the image forming apparatus 1 and the voice processing server 3 in the image processing system 100 are the same as those described in the first embodiment with reference to FIGS. 1 and 2, and duplicate descriptions are omitted.

Figure 10:
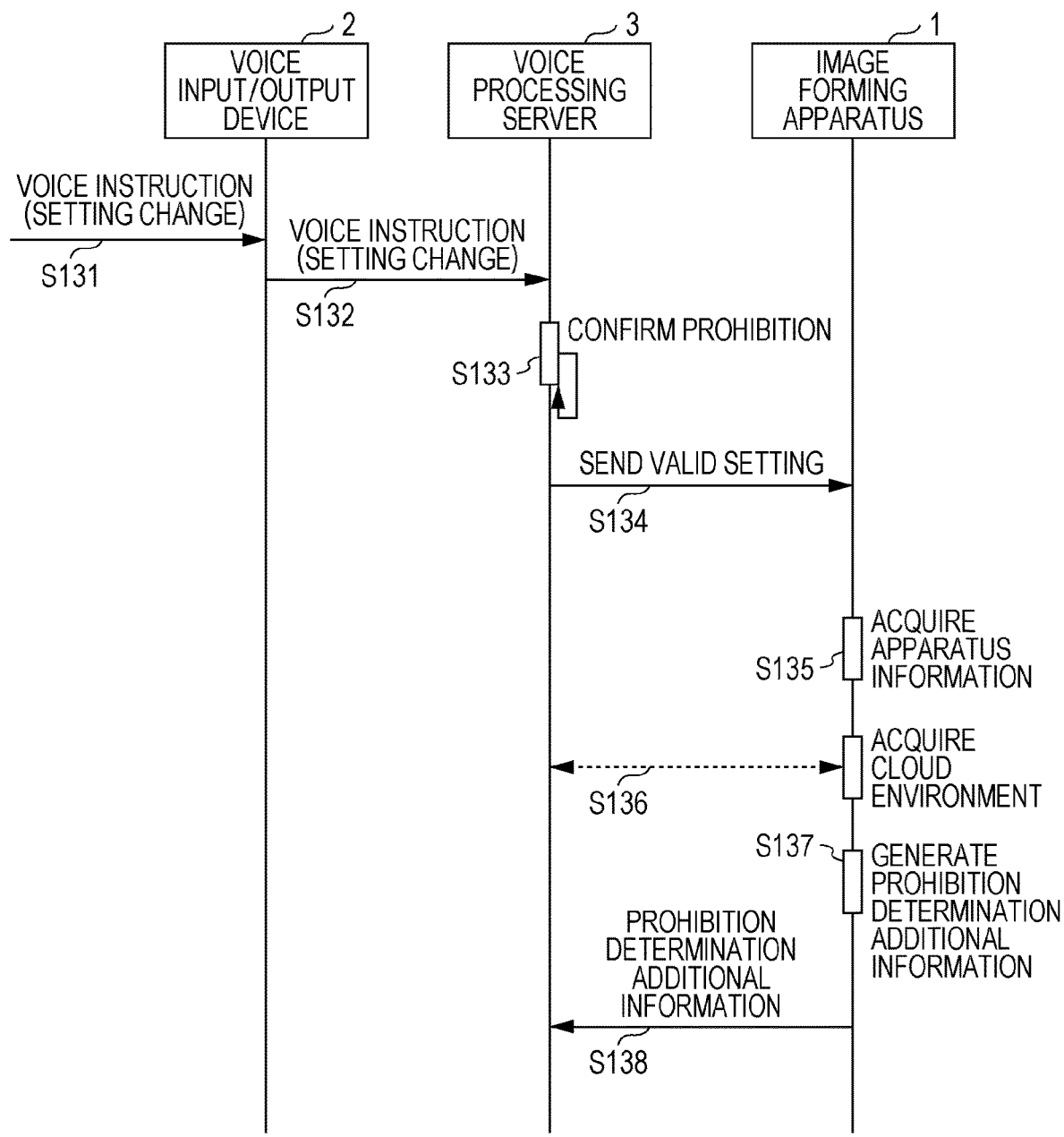
FIG. 10 is a sequence diagram illustrating an exemplary procedure according to a third embodiment of the present invention.

FIG. 10 is a sequence diagram illustrating an exemplary process for a voice operation on the image forming apparatus 1 performed in the image processing system 100 according to the present embodiment.

The voice input/output device 2 receives a voice input (step S131), and the voice information is transmitted to the voice processing server 3 (step S132). The voice input here is a voice that gives an operation instruction for changing settings of printing or the like in the image forming apparatus 1.

In response to receiving the voice information, the voice processing server 3 confirms, based on information about the image forming apparatus 1 stored in the storage 313, whether the operation specified by the instruction corresponds to prohibition processing (step S133).

If it is determined in step S133 that the operation does not correspond to prohibition processing, the voice processing server 3 sends a command for the setting change by the voice operation as a valid setting to the image forming apparatus 1 (step S134). Upon receiving this setting change command, the image forming apparatus 1 acquires its apparatus information (step S135). The apparatus information here is the same as that in step S114 of FIG. 7 in the second embodiment in that it includes not only basic conditions such as whether the apparatus itself can print, but also various situations such as the size of paper in each paper tray, the presence/absence of paper, the state of optional equipment for paper binding or the like, and paper jams.

The controller 12 of the image forming apparatus 1 acquires a cloud environment such as the state of communication with the voice processing server 3 and the processing speed of the voice processing server 3 (step S136). The cloud environment may be acquired by the image forming apparatus 1 communicating with the voice processing server 3, or may be determined by acquiring the response time or the like from the previous communication history, as in the above-described case.

Then, the controller 12 of the image forming apparatus 1 determines whether the setting received in step S134 corresponds to prohibition (step S137). The determination process is omitted from FIG. 10 because it is the same as that in the second embodiment in that if the setting does not correspond to prohibition, the image forming apparatus 1 executes the corresponding setting change, and if the setting corresponds to prohibition, the image forming apparatus 1 responds to the voice processing server 3 that the setting change is not allowed.

Then, if it is determined in step S137 that the setting corresponds to prohibition, the controller 12 of the image forming apparatus 1 transmits information regarding the prohibition determined at this time to the voice processing server 3 as prohibition determination additional information (step S138). In response to receiving this prohibition determination additional information, the voice processing server 3 stores the received additional prohibition determination information in the storage 313.

Figure 11:
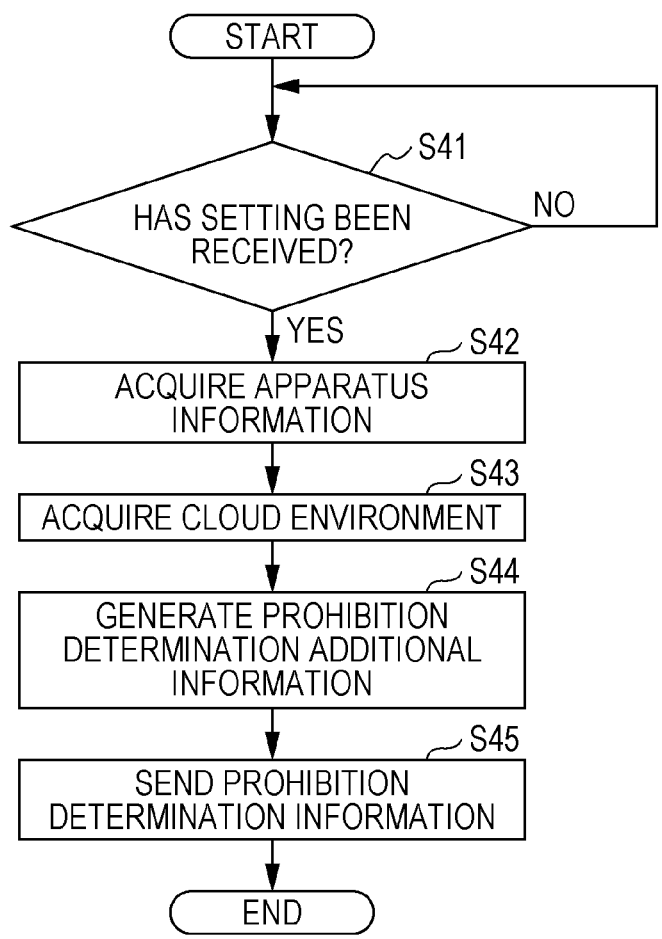
FIG. 11 is a flowchart illustrating an exemplary process in an image forming apparatus according to a third embodiment of the present invention.

FIG. 11 is a flowchart illustrating an exemplary process in the image forming apparatus 1.

The controller 12 (FIG. 2) of the image forming apparatus 1 determines whether a voice operation command has been received from the voice processing server 3 (step S41). If it is determined in step S41 that a voice operation command has not been received (NO in step S41), the determination in step S41 is repeated.

If it is determined in step S41 that a voice operation command has been received (YES in step S41), the controller 12 of the image forming apparatus 1 acquires apparatus information based on the current situation of the image forming apparatus 1 (step S42). Next, the controller 12 acquires the cloud environment of the voice processing server 3 (step S43).

Then, based on the cloud environment acquired in step S43 and the setting change information received in step S41, the controller 12 of the image forming apparatus 1 generates additional information for prohibition determination to be registered in the voice processing server 3 from the apparatus information acquired in step S42 (step S44).

The additional information for prohibition determination generated in step S44 is sent to the voice processing server 3 under the control of the controller 12 of the image forming apparatus 1 and stored in the storage 313 of the voice processing server 3 (step S45).

Fourth Embodiment

Next, an image processing system according to the fourth embodiment of the present invention will be described with reference to FIGS. 12 to 14.

The overall configuration of the image processing system 100 according to the fourth embodiment of the present invention and the configurations of the image forming apparatus 1 and the voice processing server 3 in the image processing system 100 are the same as those described in the first embodiment with reference to FIGS. 1 and 2, except for the following differences, and duplicate descriptions are omitted.

Figure 12:
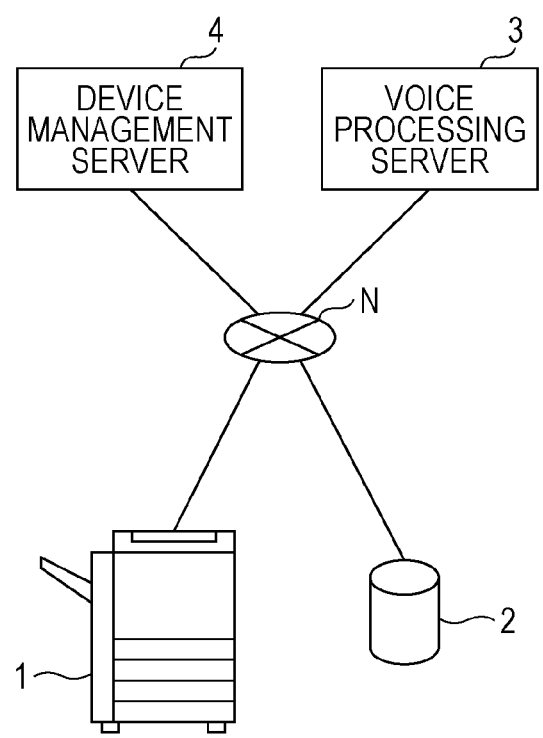
FIG. 12 is a schematic configuration diagram of an image processing system according to a fourth embodiment of the present invention.

FIG. 12 is a diagram that exemplifies the overall configuration of the image processing system 100 according to the fourth embodiment of the present invention.

The image processing system 100 illustrated in FIG. 12 differs from the image processing system 100 depicted in FIG. 1 in that a device management server 4 is connected to the network N.

That is, the image processing system 100 illustrated in FIG. 12 includes the image forming apparatus 1, the voice input/output device 2, the voice processing server 3, and the device management server 4.

The device management server 4 is a server including a storage that stores the apparatus information (device information) of the image forming apparatus 1 connected to the network N to manage the apparatus information. Specifically, in the voice processing server 3 illustrated in FIG. 2, the apparatus information of the image forming apparatus 1 is stored in the storage 313, whereas in the present embodiment, the device management server 4 stores at least part of the apparatus information of the image forming apparatus 1.

Therefore, when voice information is supplied from the voice input/output device 2, the voice processing server 3 performs the process of converting the voice information into an operation command and sending the operation command to the device management server 4. In addition, when receiving information such as a response to a voice operation from the device management server 4, the voice processing server 3 performs the process of generating voice information that conveys the response information to the user and transmitting the voice information to the voice input/output device 2.

In addition, the device management server 4 stores the apparatus information of the image forming apparatus 1, receives an operation command from the voice processing server 3, determines whether the operation command is executable, and if the operation command is executable, gives an operation instruction to the image forming apparatus 1. If the operation command is inexecutable, the device management server 4 gives a reply to the voice processing server 3.

However, as will be described later, for some information that can be determined by the voice processing server 3, the voice processing server 3 directly performs determination and performs the process of sending a response to the voice input/output device 2.

Figure 13:
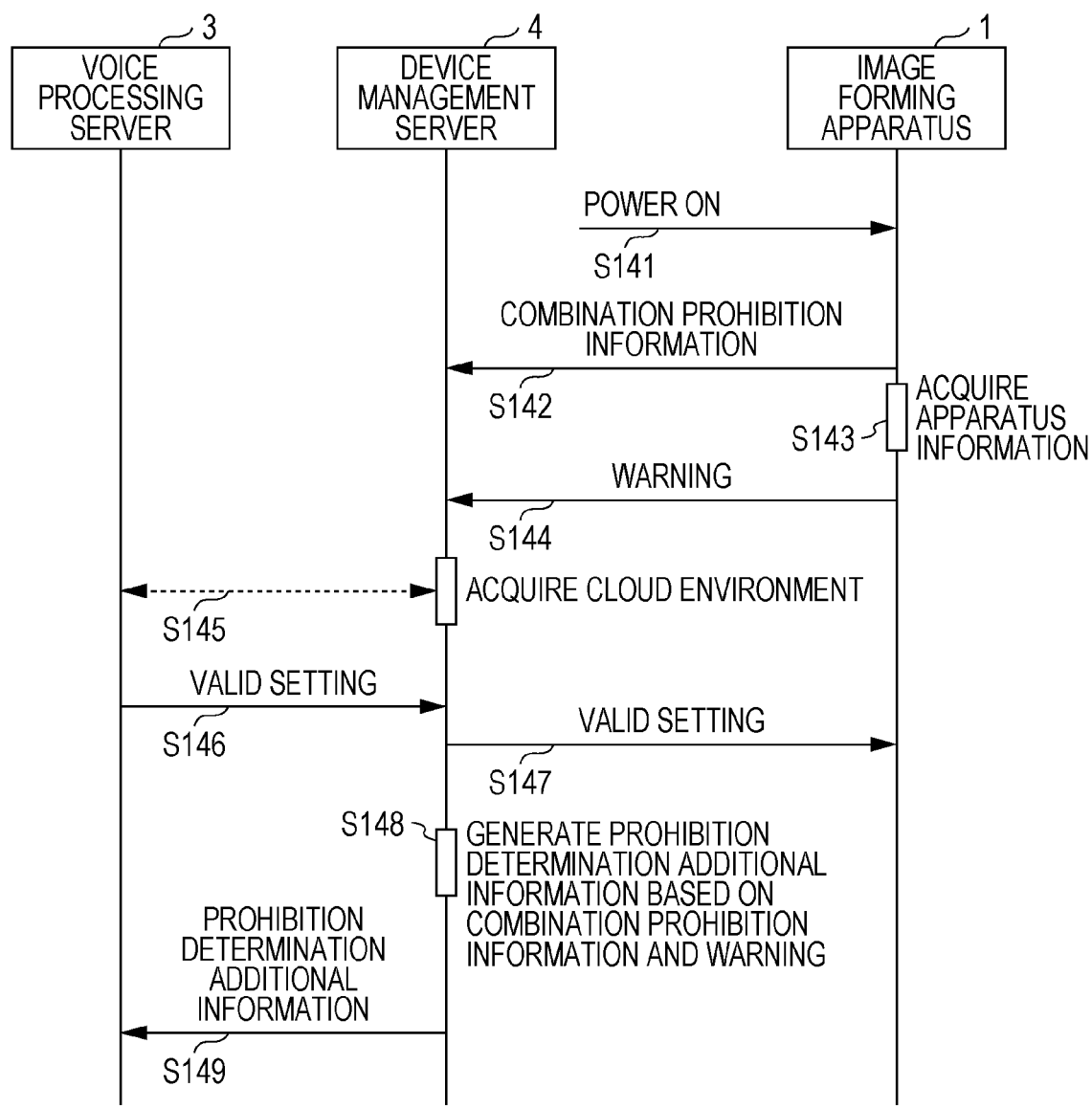
FIG. 13 is a sequence diagram illustrating an exemplary procedure according to the fourth embodiment of the present invention.

FIG. 13 is a sequence diagram illustrating an exemplary process in the voice processing server 3 and the device management server 4 of the image processing system 100 according to the present embodiment.

First, suppose that the image forming apparatus 1 is powered on (step S141). In this case, the image forming apparatus 1 sends prohibition determination information that is based on the apparatus configuration to the device management server 4 (step S142). The prohibition determination information here is information indicating that color printing is unperformable, double-sided printing is unperformable, or the like.

After that, the image forming apparatus 1 acquires its apparatus information (step S143). The apparatus information here is information that reflects various situations such as the size of paper in each paper tray, the presence/absence of paper, the state of optional equipment for paper binding or the like, and paper jams.

Based on the acquired apparatus information, the image forming apparatus 1 transmits the current situation of the apparatus to the device management server 4 as warning information (step S144). The device management server 4 stores the received warning information.

The device management server 4 also acquires a cloud environment such as the state and speed of communication with the voice processing server 3 (step S145).

Here, a command (valid setting command) that is based on voice information is transmitted from the voice processing server 3 to the device management server 4 (step S146), and the command is transmitted from the device management server 4 to the image forming apparatus 1 (step S147).

The device management server 4 generates prohibition determination additional information to be transmitted to the voice processing server 3 based on the prohibition determination information acquired in step S142 and the cloud environment acquired in step S145 (step S148). Then, the device management server 4 sends the generated prohibition determination additional information to the voice processing server 3 (step S149). At this time, the prohibition determination additional information sent to the voice processing server 3 is stored in the voice processing server 3.

Figure 14:
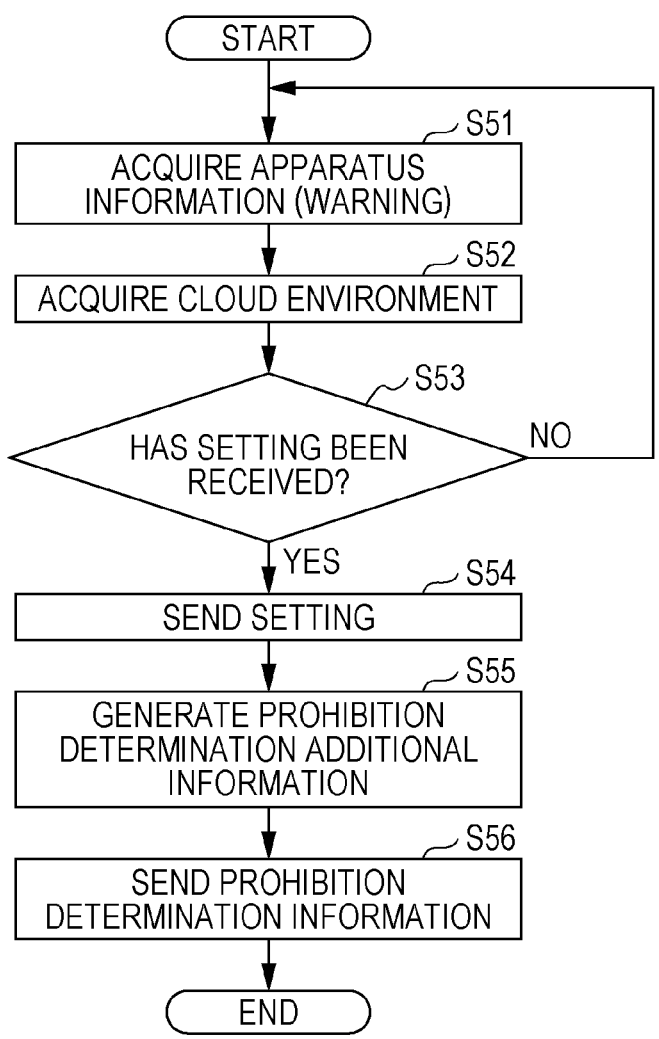
FIG. 14 is a flowchart illustrating an exemplary process according to the fourth embodiment of the present invention.

FIG. 14 is a flowchart illustrating an exemplary process in the device management server 4.

The device management server 4 acquires apparatus information as warning information from the image forming apparatus 1 (step S51). The device management server 4 also acquires a cloud environment such as the state and speed of communication with the voice processing server 3 (step S52).

Then, the device management server 4 determines whether a setting command has been received from the voice processing server 3 (step S53). If it is determined in step S53 that a setting command has not been received (NO in step S53), the device management server 4 returns to step S51.

If it is determined in step S53 that a setting command has been received (YES in step S53) and the received setting does not correspond to prohibition, the device management server 4 sends the received setting to the image forming apparatus 1 (step S54). After that, the device management server 4 generates prohibition determination additional information based on the received warning information and the cloud environment (step S55), and sends the generated prohibition determination information to the voice processing server 3 (step S56).

In this manner, the voice processing server 3 and the device management server 4 share the determination of prohibition determination information, and the prohibition determination information stored in the voice processing server 3 is updated as needed in accordance with the cloud environment, which makes it possible to appropriately shorten the time from the acceptance of the user's voice by the voice input/output device 2 to the response.

Modifications

The present invention is not limited to the above-described embodiments, and various other applications and modifications can be made without departing from the gist of the present invention described in the claims.

Each of the above-described embodiments describes an example in which a smart speaker is used as the voice input/output device 2, but the present invention is not limited to this. As the voice input/output device 2, a mobile terminal device carried by the user such as a mobile phone terminal or a smartphone may be used.

Basically, responses about operations on the image forming apparatus 1 are output from the voice input/output device 2 (smart speaker). However, when the image forming apparatus 1 determines that an operation or setting corresponds to prohibition, a speaker provided in the image forming apparatus 1 may output a response voice or warning sound indicating that the operation or setting is not allowed. The output of a response voice or warning sound from the speaker in the image forming apparatus 1 may be performed in parallel with the output of a response voice from the voice input/output device 2. Alternatively, when a response voice is output from the speaker in the image forming apparatus 1, no response voice may be output from the voice input/output device 2.

In addition, when the image forming apparatus 1 determines that an operation or setting corresponds to prohibition, an operation panel provided in the image forming apparatus 1 may display that the operation or setting is not allowed.

Each of the above-described exemplary embodiments describes a preferable example in which the voice processing server 3 or the device management server 4 and the image forming apparatus 1 share operation prohibition notification processing during the voice operation service. However, operation prohibition notification processing during the voice operation service may be shared by the server 3 or 4 and the image forming apparatus 1 from another perspective. For example, the voice processing server 3 or the device management server 4 may store prohibition determination information about items for which voice operations are frequently performed, and the image forming apparatus 1 may perform prohibition determination of items for which voice operations are infrequently performed. The frequency of voice operations is determined, for example, in accordance with past voice operation history. In the case of such frequency-based sharing, how the server 3 or 4 and the image forming apparatus 1 share operation prohibition notification processing during the voice operation service is still dynamically changed in accordance with the change of voice operation history.

In each of the above-described exemplary embodiments, additional information is acquired based on the function or configuration confirmed at the time of activation such as when the image forming apparatus 1 is powered on or when the voice operation function is started in the system 100, and the additional information is sent to the server 3 or 4. Alternatively, the image forming apparatus 1 may constantly monitor whether the situation of the apparatus itself changes, so that when the situation of the apparatus itself changes, the image forming apparatus 1 can send the prohibition determination information added or changed to the server 3 or 4.

The processing in the server 3 or 4 and the image forming apparatus 1 described in each of the above-described exemplary embodiments may be configured as a program that executes the procedure therefor, and may be installed in an existing server or image forming apparatus, so that the existing server or image forming apparatus can be configured as the image processing system 100 of the present invention. The program can be stored in a recording medium such as a semiconductor memory or any type of disk. Alternatively, the program may be distributed to the server or image forming apparatus via a transmission medium such as the Internet.

Although embodiments of the present invention have been described and illustrated in detail, the disclosed embodiments are made for purposes of illustration and example only and not limitation. The scope of the present invention should be interpreted by terms of the appended claims

What is claimed is:
1. A voice operation system comprising:
   an image forming apparatus that forms an image on a recording material;
   a server that accepts voice information related to an operation on the image forming apparatus, and gives an operation instruction to the image forming apparatus;
   wherein
   when the operation associated with the voice information is a first type of operation, the server itself determines executability of the operation, and when the operation associated with the voice information is a second type of operation, the server causes the image forming apparatus to determine executability of the operation.

2. The voice operation system according to claim 1, wherein
   the hardware processor of the server stores basic information associated with a function or configuration that is based on a basic configuration of the image forming apparatus, and additional information transmitted from the image forming apparatus, and
   the server determines executability of an operation in the image forming apparatus based on the basic information and the additional information stored in the hardware processor.

3. The voice operation system according to claim 2, wherein
   the additional information is information that determines executability based on a combination of multiple functions, or information that changes executability depending on a situation.

4. The voice operation system according to claim 3, wherein
   when the image forming apparatus is activated, the additional information that is based on the function or configuration confirmed at the time of activation is sent to the server.

5. The voice operation system according to claim 2, wherein
   the additional information is sent from the image forming apparatus to the server and updated when a voice response service is started by the voice input/output device.

6. The voice operation system according to claim 3, wherein
   when a situation that makes an operation inexecutable is removed in the image forming apparatus, additional information indicating the removal is sent from the image forming apparatus to the server and updated.

7. The voice operation system according to claim 2, wherein
   the additional information is sent from the image forming apparatus to the server and updated when the function or configuration is changed in the image forming apparatus.

8. The voice operation system according to claim 2, wherein
   an amount of additional information that is stored in the hardware processor of the server is dynamically set in accordance with a time or communication speed required for communication between the server and the image forming apparatus.

9. The voice operation system according to claim 2, wherein
an amount of additional information that is stored in the hardware processor of the server is set based on a response time from acceptance of a voice input of an instruction by the voice input/output device to output of a response by the voice input/output device.

10. The voice operation system according to claim 1, further includes a voice input/output device that converts an input voice related to an operation into voice information, sends the voice information to the server, and receives, from the server, voice information as a response to the voice information related to the operation on the image forming apparatus, and emits a sound of the voice information;
wherein
the server includes:
a voice processing server that communicates with the voice input/output device; and
a device management server that communicates with the voice processing server and the image forming apparatus, and
the device management server includes the hardware processor.

11. A voice operation method that is executed in a system, the system comprising:
an image forming apparatus that forms an image on a recording material;
a server that accepts voice information related to an operation on the image forming apparatus, and gives an operation instruction to the image forming apparatus; and
the voice operation method includes:
when the operation associated with the voice information is a first type of operation, the server itself determines executability of the operation, and when the operation associated with the voice information is a second type of operation, the server causes the image forming apparatus to determine executability of the operation.

12. A non-transitory recording medium storing a computer readable program that is executed by a computer that accepts, from a voice input/output device, voice information related to an operation on an image forming apparatus, gives an operation instruction to the image forming apparatus, and outputs, to the voice input/output device, voice information as a response to the operation instruction, the computer readable program causing the computer to execute:
receiving voice information accepting a voice related to an operation on the image forming apparatus; and
when the operation associated with the voice information is a first type of operation, the server itself determines executability of the operation, and when the operation associated with the voice information is a second type of operation, the server causes the image forming apparatus to determine executability of the operation.

* * * * *